(12) United States Patent
Kakutani

(10) Patent No.: US 10,798,266 B2
(45) Date of Patent: Oct. 6, 2020

(54) IMAGE PROCESSING APPARATUS, PRINTING APPARATUS, AND IMAGE PROCESSING METHOD FOR PERFORMING HALFTONE PROCESSING ON DIVIDED IMAGES

(71) Applicant: SEIKO EPSON CORPORATION, Tokyo (JP)

(72) Inventor: Toshiaki Kakutani, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/544,947

(22) Filed: Aug. 20, 2019

(65) Prior Publication Data

US 2020/0068091 A1 Feb. 27, 2020

(30) Foreign Application Priority Data

Aug. 22, 2018 (JP) ................... 2018-155359

(51) Int. Cl.
| | |
|---|---|
| *H04N 1/40* | (2006.01) |
| *H04N 1/405* | (2006.01) |
| *H04N 1/60* | (2006.01) |
| *G06K 15/02* | (2006.01) |
| *H04N 1/52* | (2006.01) |
| *H04N 1/58* | (2006.01) |

(52) U.S. Cl.
CPC ........... *H04N 1/4053* (2013.01); *G06K 15/18* (2013.01); *H04N 1/52* (2013.01); *H04N 1/58* (2013.01); *H04N 1/60* (2013.01)

(58) Field of Classification Search
None
See application file for complete search history.

(56) References Cited

U.S. PATENT DOCUMENTS

| | | | | |
|---|---|---|---|---|
| 7,483,176 | B2 * | 1/2009 | Suzuki | ................... H04N 1/405 358/1.2 |
| 2004/0257623 | A1 | 12/2004 | Suzuki | |
| 2011/0063684 | A1 | 3/2011 | Kakutani | |
| 2014/0362415 | A1 | 12/2014 | Kakutani | |
| 2014/0362416 | A1 | 12/2014 | Kakutani | |

FOREIGN PATENT DOCUMENTS

| | | | |
|---|---|---|---|
| JP | 2005-012726 A | | 1/2005 |
| JP | 2010-244098 A | | 10/2010 |
| JP | 2011-066594 A | | 3/2011 |
| JP | 2014-236459 A | | 12/2014 |
| JP | 2014-236460 A | | 12/2014 |
| JP | 2016-163212 | * | 9/2016 |

\* cited by examiner

*Primary Examiner* — Barbara D Reinier
(74) *Attorney, Agent, or Firm* — Global IP Counselors, LLP

(57) ABSTRACT

A plurality of halftone processing units are provided for processing each of a plurality of pieces of image data corresponding to a plurality of divided images to generate dot data representing presence or absence of dot formation. At least two halftone processing units simultaneously perform at least a part of halftone processing for at least two pieces of image data. In the halftone processing, complex error diffusion method processing of matching at least a part of dot data obtained by performing halftone processing using an error diffusion method for an error diffused gradation value of each pixel of a divided image with a determination result of a dither method, is performed.

11 Claims, 13 Drawing Sheets

IMAGE PROCESSING APPARATUS, PRINTING APPARATUS, AND IMAGE PROCESSING METHOD FOR PERFORMING HALFTONE PROCESSING ON DIVIDED IMAGES

The present application is based on, and claims priority from JP Application Serial Number 2018-155359, filed Aug. 22, 2018, the disclosure of which is hereby incorporated by reference herein in its entirety

BACKGROUND

1. Technical Field

The present disclosure relates to a technology of performing halftone processing of a target image in parallel.

2. Related Art

In order to speed up halftone processing performed when a multi-tone image is printed, dividing a target image and performing parallel processing are proposed. In a case where an error diffusion method is used as the half toning processing, there may be a problem in which an image quality is degraded at a boundary of the divided image. This is because, a quantization error generated when a focused pixel is quantized is distributed to unprocessed peripheral pixels in the error diffusion method, but an error cannot be properly diffused beyond the boundary of the divided image if an error diffusion is performed independently for each of the divided images. Therefore, for example, as illustrated in JP-A-2005-12726, a method is proposed in which an overlapping region is provided in a boundary region between the respectively divided images and halftone processing is completed by using a result of the error diffusion performed for both regions.

However, such a method does not provide a fundamental solution to degradation in image quality in a boundary region. It is because, even if the overlapping region is provided in the boundary region, an error is not completely taken over. If the overlapping region is widened, after all it takes time for error diffusion.

SUMMARY

An image processing apparatus according to the present disclosure can be implemented in the following aspect. That is, the image processing apparatus which performs halftone processing of an image is provided as a first aspect. The image processing apparatus includes an image receiving unit which receives a plurality of pieces of image data corresponding to a plurality of divided images obtained by dividing the image, and a plurality of halftone processing units which perform halftone processing of each of the plurality of pieces of image data to generate dot data representing presence or absence of dot formation and in which at least two halftone processing units simultaneously perform at least a part of processing for the at least two pieces of image data. Here, each of the halftone processing units may perform complex error diffusion method processing of matching at least a part of the dot data obtained by performing halftone processing using an error diffusion method for a gradation value in which an error diffusion of each pixel of the divided image is completed with a determination result of a dither method.

In addition to the above-described aspect, the present disclosure can implement an aspect as an image processing method and another aspect as a printing apparatus, and furthermore, can be implemented by a configuration as a control apparatus of the image processing apparatus or the printing apparatus, and as a manufacturing method of the image processing apparatus or the printing apparatus, or the like.

DESCRIPTION OF EXEMPLARY EMBODIMENTS

A. First Embodiment

Figure 1:
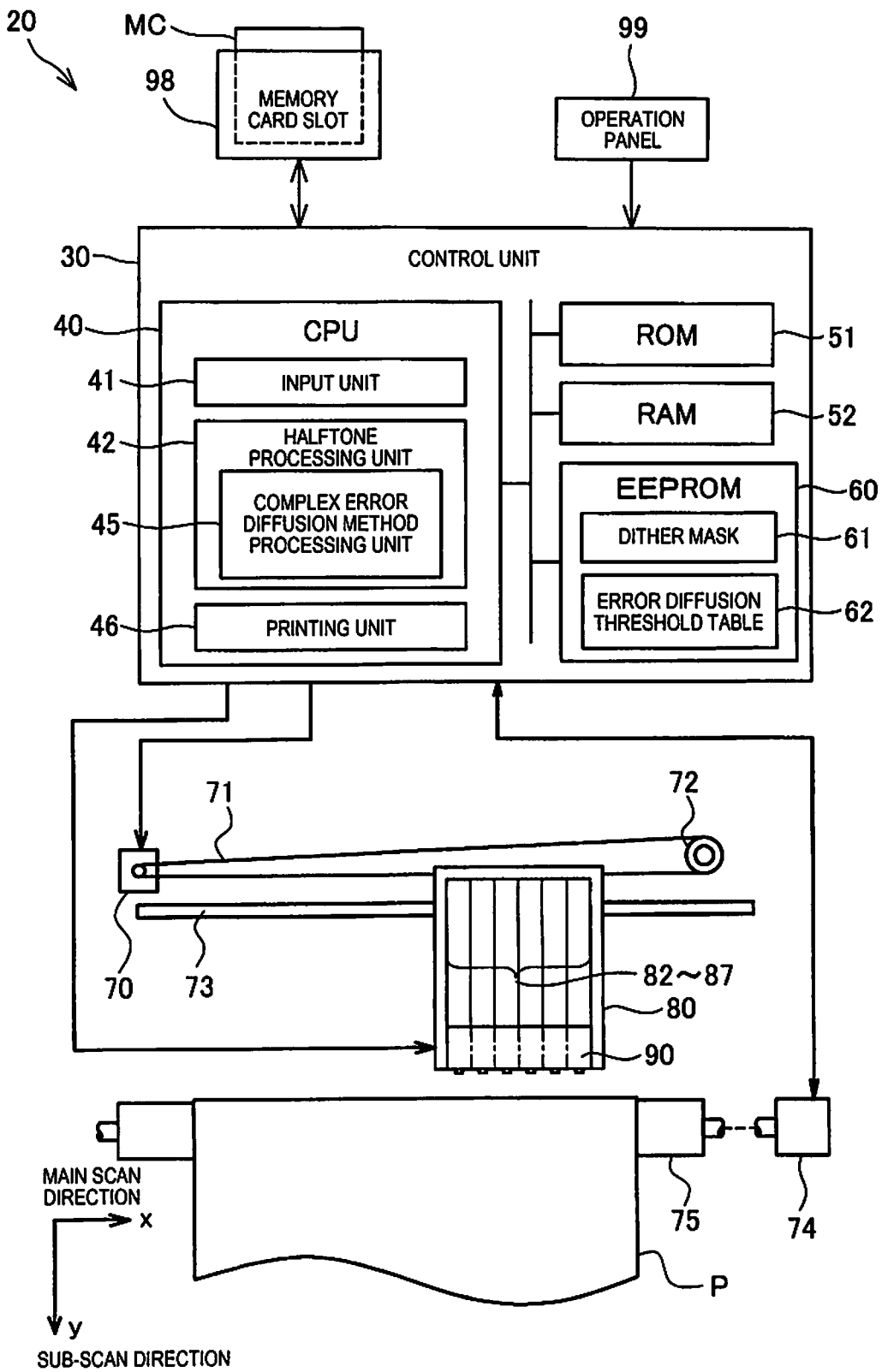
FIG. 1 is a schematic configuration diagram of a printer as a printing apparatus according to a first embodiment.

1 Hardware Configuration:

FIG. 1 is a schematic configuration diagram of a printer 20 as an image processing apparatus according to a first embodiment and a printing apparatus including the image processing apparatus. The printer 20 is a serial type ink jet printer that performs bi-directional printing, and as illustrated, the printer 20 is configured with a mechanism that transports a printing medium P by using a paper feeding motor 74, a mechanism that makes a carriage 80 reciprocate in an axial direction of a platen 75 by using a carriage motor 70, a mechanism that drives a printing head 90 mounted on the carriage 80 to eject ink droplets so as to form dots, and a control unit 30 which controls exchange of signals with the paper feeding motor 74, the carriage motor 70, the printing head 90, and an operation panel 99.

The mechanism that makes the carriage 80 reciprocate in the axial direction of the platen 75 is installed in parallel with an axis of the platen 75 and is configured with a sliding shaft 73 which slidably holds the carriage 80, a pulley 72 which stretches an endless drive belt 71 with the carriage motor 70, and the like.

Ink cartridges 82 to 87 for color ink which accommodate cyan ink C, magenta ink M, yellow ink Y, black ink K, light cyan ink Lc, and light magenta ink Lm, respectively, as color inks are mounted on the carriage 80. A nozzle row corresponding to the color inks of the respective colors described above is formed in the printing head 90 under the carriage 80. If the ink cartridges 82 to 87 are mounted on the carriage 80 from above, ink can be supplied from the respective cartridges to the printing head 90.

The control unit 30 is configured with a CPU 40, a ROM 51, a RAM 52, and an EEPROM 60 which are connected to each other via a bus. The control unit 30 develops a program stored in the ROM 51 or the EEPROM 60 in the RAM 52, and executes the program to control an overall operation of the printer 20, and also functions as an input unit 41, a halftone processing unit 42, and a printing unit 46. The halftone processing unit 42 has a function as a complex error diffusion method processing unit 45. The CPU 40 employed in the present embodiment includes multiple cores and realizes the halftone processing unit 42 as a plurality of halftone units that can operate simultaneously. The halftone unit may hereinafter be abbreviated as HTU. Functions of the plurality of halftone units configuring the halftone processing unit 42, particularly, an operation of the complex error diffusion method processing unit 45 will be described below with reference to flowcharts of FIGS. 2 and 4.

The EEPROM 60 stores a dither mask 61 and an error diffusion threshold table 62. The dither mask 61 is used for halftone processing which will be described below and is an array of thresholds for determining dot formation. The dither mask 61 will also be described below.

The error diffusion threshold table 62 stored in the EEPROM 60 is a table in which a threshold (error diffusion method threshold) used for determining ON/OFF of a dot in an error diffusion method is stored. In a first embodiment, the error diffusion method threshold corresponding to a second threshold is stored as a value having a correlation with image data to be compared. Meanwhile, in a second embodiment which will be described below, the error diffusion method threshold includes a lower threshold THe_L and an upper threshold THe_H of different values. A value and a role of the error diffusion method threshold will be described in detail below.

A memory card slot 98 is connected to the control unit 30, and image data ORG can be read from a memory card MC inserted into the memory card slot 98 and can be input to the control unit. In the present embodiment, the image data ORG input from the memory card MC is data configured by color components of three colors of red (R), green (G) and blue (B).

The printer 20 having the above-described hardware configuration drives the carriage motor 70 to cause the printing head 90 to reciprocate in a main scan direction with respect to a printing medium P, and drives the paper feeding motor 74 to cause the printing medium P to move in a sub-scan direction. The control unit 30 drives a nozzle at an appropriate timing based on the print data in accordance with the reciprocating movement (main scan) of the carriage 80 and the paper feeding movement of the printing medium (sub-scan), and thereby, ink dots of appropriate colors are formed at an appropriate location of the printing medium P. By doing so, the printer 20 can print a color image input from the memory card MC on the printing medium P.

Figure 2:
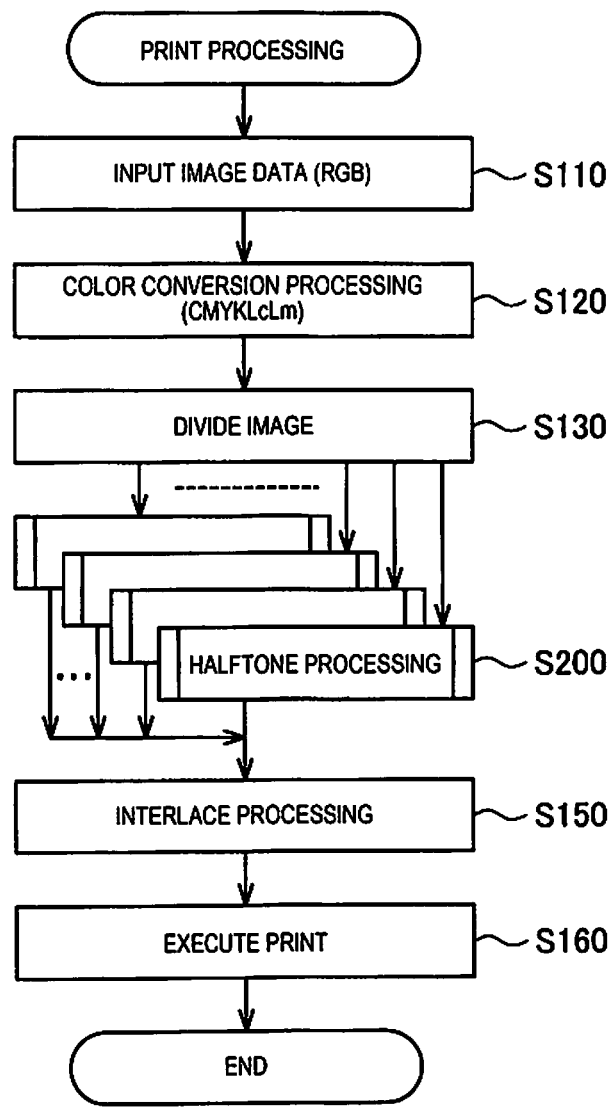
FIG. 2 is a flowchart illustrating a flow of printing processing of the printer.

2 Printing Processing:

An outline of printing processing according to the embodiment will be described. FIG. 2 is a flowchart illustrating a flow of the printing processing of the printer 20. The printing processing herein starts when a user performs a printing instruction operation of a predetermined image stored in the memory card MC by using the operation panel 99 or the like. If the printing processing starts, the CPU 40 first reads and receives RGB format image data ORG which is a printing target and which is stored in the memory card MC, from the input unit 41 via the memory card slot 98 as processing of an image receiving unit (step S110).

If the image data ORG is input, the CPU 40 performs a color conversion of the RGB format of the image data ORG into a CMYKLcLm format with reference to a look-up table (not illustrated) stored in the EEPROM 60 (step S120). The color conversion processing is well known, and thus, description thereon will be omitted.

Figure 3:
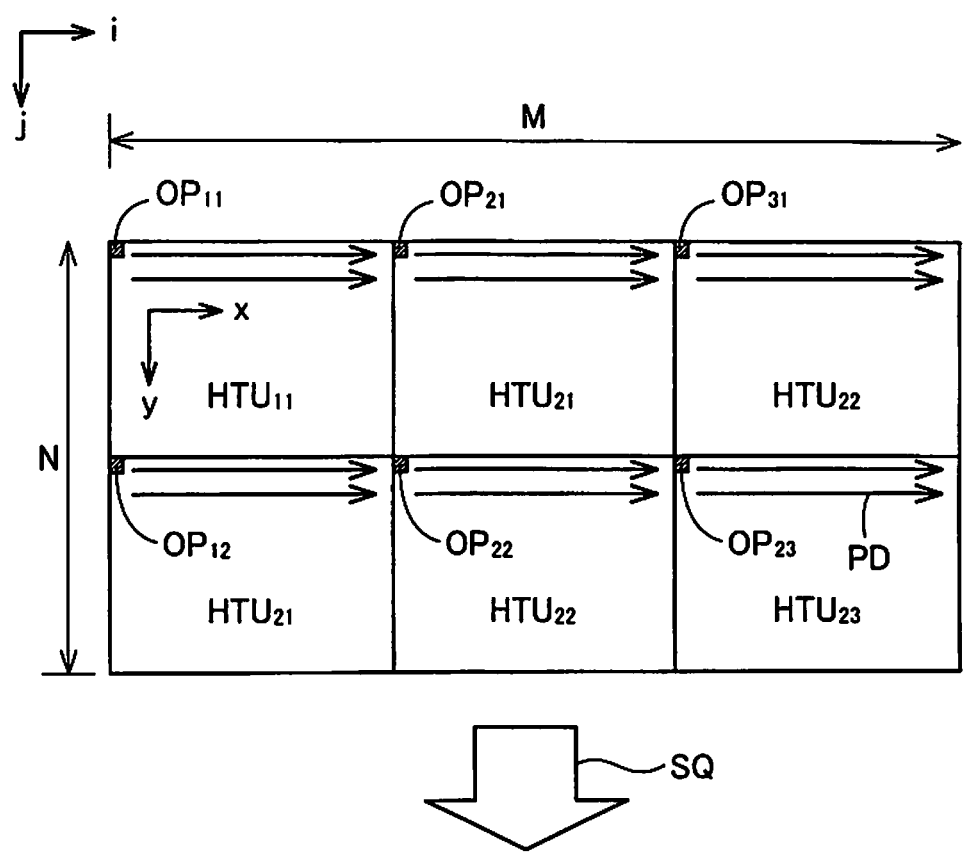
FIG. 3 is an explanatory diagram illustrating a relationship between an image division state and a halftone unit.

Thereafter, processing dividing the image is performed (step S130). In the present embodiment, it is assumed that the image is divided into total six regions of three in the main scan direction and two in the sub-scan direction as illustrated in FIG. 3. If the number of divisions may be any number as long as the number is larger than or equal to 2. The division of the image is performed according to the number of HTUs included in the halftone processing unit 42. In the present embodiment, the halftone processing unit 42 includes six HTUs HTU11 to HTU23 that can operate simultaneously. It is assumed that which number of unit the respective HTUs in the main scan direction are is denoted by a suffix i and which number of unit the respective HTUs in the sub-scan direction are is denoted by the suffix j. Accordingly, the halftone unit is written as HTUij.

If it is assumed that the number of pixels of an image to be printed in the main scan direction is denoted by M, the number of pixels in the sub-scan direction is denoted by N, the number of units in the main scan direction is denoted by a, and the number of units in the sub-scan direction is denoted by b, the number of pixels handled by each halftone unit is M/a·N/b. In addition, it is assumed that M/a and N/b is divisible. When it is not divisible, the number of pixels of the image may be artificially increased to be divisible. In FIG. 3, the main scan direction is indicated by an arrow PD, and the sub-scan direction is indicated by an arrow SD.

Coordinates of a pixel OPij that each HTUij' starts to process can be represented as following Equation (1).

$$OPij=\{(i-1)\cdot M/a, (j-1)\cdot N/b\} \quad (1)$$

Each HTUij processes x pixels in the main scan direction from here and processes y pixels (raster) in the sub-scan direction by using coordinates of the pixel OPij as an origin.

After the image is divided (step S130), the CPU 40 starts up HTUij for each divided image as processing of the halftone processing unit 42, and performs the halftone processing of converting the image data into dot data in which ON/OFF of each color dot is determined for each pixel (step S200). Details of the halftone processing here will be described below. In the present specification, the "halftone processing" is not limited to binarization processing of the ON/OFF of dot and means general gradation number conversion (reduction) processing including multi-valued processing such as ON/OFF of large/small dots, large/medium/small dots, or the like. The image data provided to step S200 may be subjected to image processing such as resolution conversion processing or smoothing processing.

If the halftone processing (step S200) is performed for each of the divided images, the CPU 40 combines the dot data whose halftone processing is performed for each of the divided images to use as dot data corresponding to the original image, and in contrast to this, interlace processing of rearranging to dot pattern data to be printed in a main scan unit once is performed according to a nozzle arrangement of the printer 20, a paper feeding amount, and the like (step S150). If the interlace process is performed, the CPU 40 drives the printing head 90, the carriage motor 70, the motor 74, and the like to perform printing as processing of the printing unit 46 (step S160).

3 Halftone Processing:

Details of the halftone processing (step S200) performed by each HTUij will be described by using FIG. 4. The halftone processing is performed for each divided image, that is, performed in parallel. Each HTUij performs sequential processing by setting the upper left pixel OPij of the divided image as a start point, setting coordinates in the main scan direction PD as x, and setting coordinates in the sub-scan direction as y, as illustrated in Equation (1).

Figure 4:
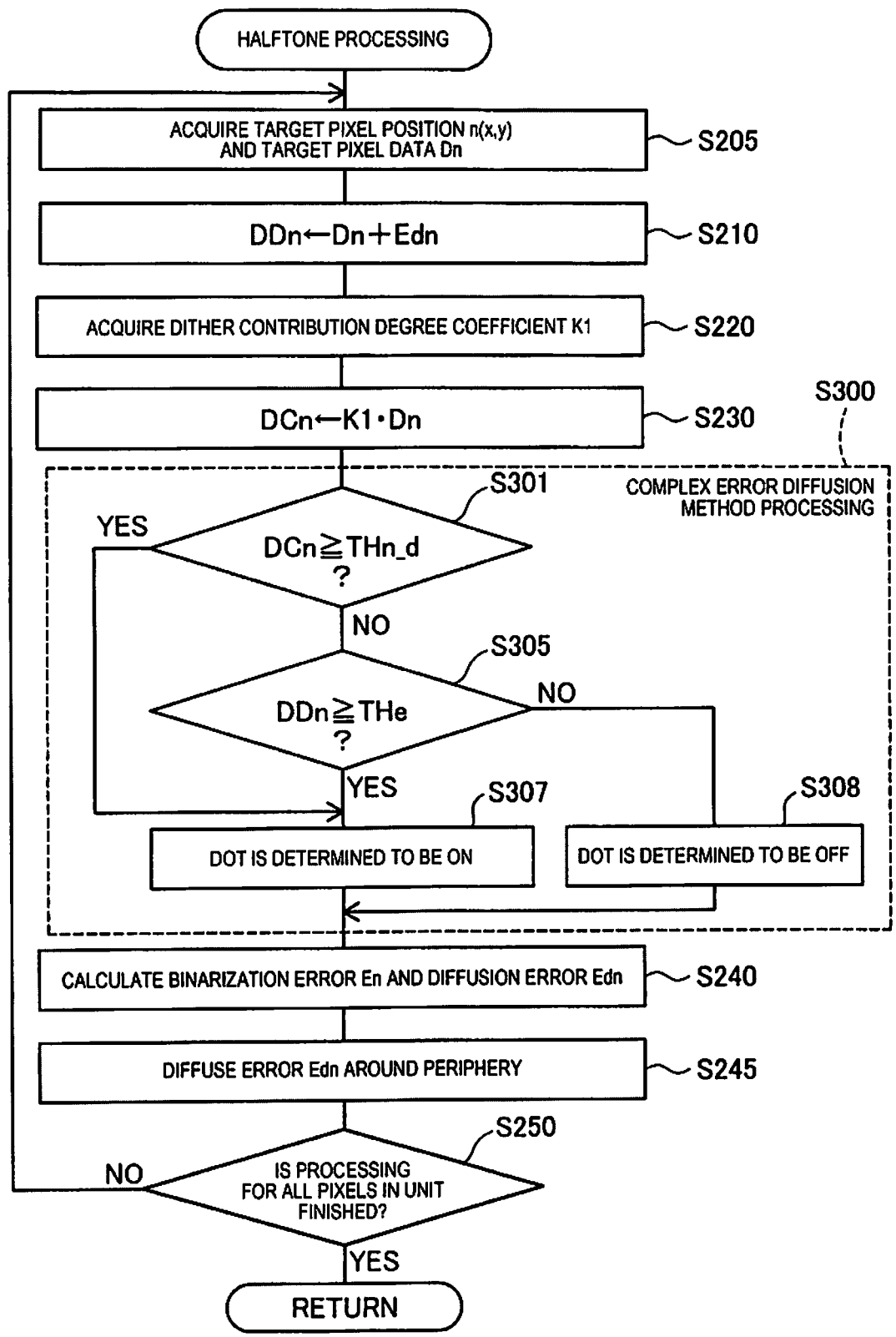
FIG. 4 is a flowchart illustrating halftone processing performed by one halftone unit.

If the halftone processing illustrated in FIG. 4 starts, an interest pixel location n (x, y) and interest pixel data Dn are acquired for the divided image to be processed by one HTUij (step S205). The interest pixel location n (x, y) starts from the pixel OPij which is the start point of the divided image of a processing target, that is, n(x,y)=n(0,0), the coordinate x is sequentially increased in the main scan direction, the coordinate x is reset to a value of 0 if the coordinate x reaches the end of the divided image region, the coordinate y is sequentially incremented in the sub-scan direction or the coordinate x is sequentially incremented in the main scan direction, and such processing is repeated, and the processing moves to the last (lower right in FIG. 2) of the divided image region.

The interest pixel data Dn is a gradation value of the pixel at the interest pixel location n(x,y). In a case of a color image, the interest pixel data Dn is configured by gradation values for the ink of six colors CMYKLcLm according to the color conversion, but since the following processing is repeated for the gradation values of the respective colors so as to be the same, the gradation values of the respective colors are simply handled as the interest pixel data Dn without distinction.

Next, processing of obtaining diffused image data DDn is performed by adding a diffusion error Edn to the interest pixel data Dn (step S210). The diffusion error is obtained by diffusing a density error generated by performing the processing of FIG. 4 on the interest pixel, determining the ON/OFF of a dot, and obtaining the dot data, to peripheral pixels. The diffusion error is cumulatively stored in an error diffusion buffer prepared in the RAM 52. Details of the error diffusion will be described in detail below in step S240.

Figure 5:
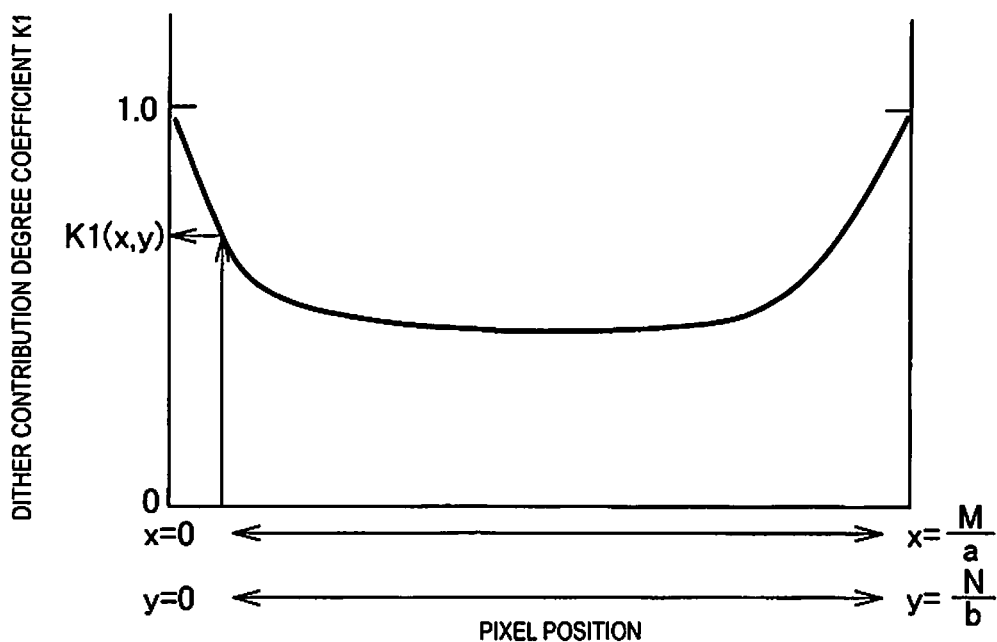
FIG. 5 is an explanatory diagram exemplifying a relationship between a pixel location and a dither contribution degree coefficient.

Subsequently, processing of acquiring a dither contribution degree coefficient K1 is performed (step S220). The dither contribution degree coefficient K1 corresponds to a first contribution degree coefficient and is a coefficient that determines how much a determination result of dot formation obtained by dither processing affects a final determination of presence or absence of the dot formation made by error diffusion processing during complex error diffusion method processing which will be described below. In the first embodiment, the dither contribution degree coefficient K1 is set to change depending on the pixel location in the main scan direction and the pixel location in the sub-scan direction, as exemplified in FIG. 5. When the image is divided into a images in the main scan direction and b images in the sub-scan direction, if the pixel OPij, which exists at the start location, of one divided image is set to n(0,0), the last pixel location x in the main scan direction is M/a, and the last pixel location y in the sub-scan direction is N/b. As illustrated in FIG. 5, in a range of pixel locations 0 to M/a in the main scan direction, the dither contribution degree coefficient K1 approaches a value of 1 as the dither contribution degree coefficient approaches a location of the adjacent divided image. Likewise, in a range of pixel locations 0 to N/b in the sub-scan direction, the dither contribution degree coefficient K1 approaches the value of 1 as the dither contribution degree coefficient approaches a location of the adjacent divided image. When K1 obtained from the pixel location in the main scan direction is different from K1 obtained from the pixel location in the sub-scan direction, the larger dither contribution degree coefficient may be adopted. Alternatively, the dither contribution degree coefficient may be determined to a direction of preferential adoption according to the amount of vertical and horizontal components included in the image. The dither contribution degree coefficient K1 may be obtained by calculation based on the pixel location or may be acquired with reference to a table previously stored in the EEPROM 60. In the example illustrated in FIG. 5, the dither contribution degree coefficient K1 is set to be continuously reduced to be smaller than the value of 1 as the dither contribution degree coefficient is far away from a boundary, but the dither contribution degree coefficient K1 may not be continuous, and for example, a value at a first point adjacent to the divided boundary of the divided image may be previously set to be larger than a value at a second point farther from the boundary than the first point.

Figure 6:
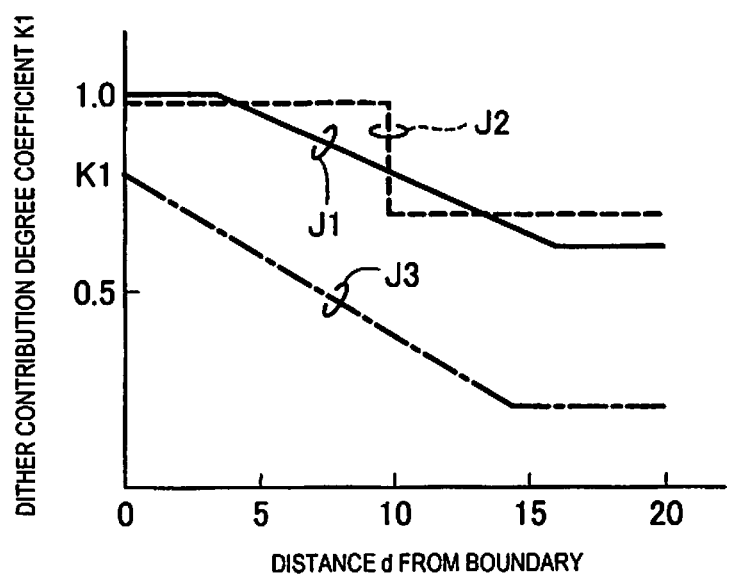
FIG. 6 is an explanatory diagram exemplifying another relationship between the pixel location and the dither contribution degree coefficient.

Here, the pixel location n(x,y) is directly associated with the dither contribution degree coefficient K1, but the dither contribution degree coefficient K1 may be defined as a value according to a distance from the boundary of the divided image, specifically, the number of pixels from the boundary, as illustrated in FIG. 6. In the example illustrated by a solid line J1 in FIG. 6, the dither contribution degree coefficient K1 is a value of 1 within five pixels from the boundary, and becomes constant at a value of 0.6 if the dither contribution degree coefficient is separated from the boundary by 15 pixels or more, and the dither contribution degree coefficient is set to be gradually reduced therebetween. In addition, the dither contribution degree coefficient K1 may be gradually changed as illustrated by a dashed line J2, may be reduced from 0.8 to 0.2 as illustrated by an alternated long and short dash line J3 that is, the dither contribution degree coefficient K1 may be reduced on the whole.

After the dither contribution degree coefficient K1 is obtained, the dither determination data DCn is obtained by multiplying the image data Dn of a focused pixel by the dither contribution degree coefficient K1 (step S230). The dither contribution degree coefficient K1 is a coefficient that makes gradation values of the respective pixels become values relatively smaller than a first threshold when comparing the gradation values of the respective pixels with the first threshold in the determination of a dither method. Accordingly, the following equation is set.

$$K1=DCn/DDn \leq 1$$

In the above-described embodiment, the dither contribution degree coefficient K1 is multiplied by the image data Dn of the pixel, but a first threshold THn_d which is compared in the determination of the dither method that will be described below may be divided by the dither contribution degree coefficient K1, or the dither contribution degree coefficient may be multiplied by a coefficient larger than or equal to 1. After the preparation described above, that is, after the diffused image data DDn and the dither determination data DCn are obtained, the complex error diffusion method processing (step S300) is performed.

Figure 7:
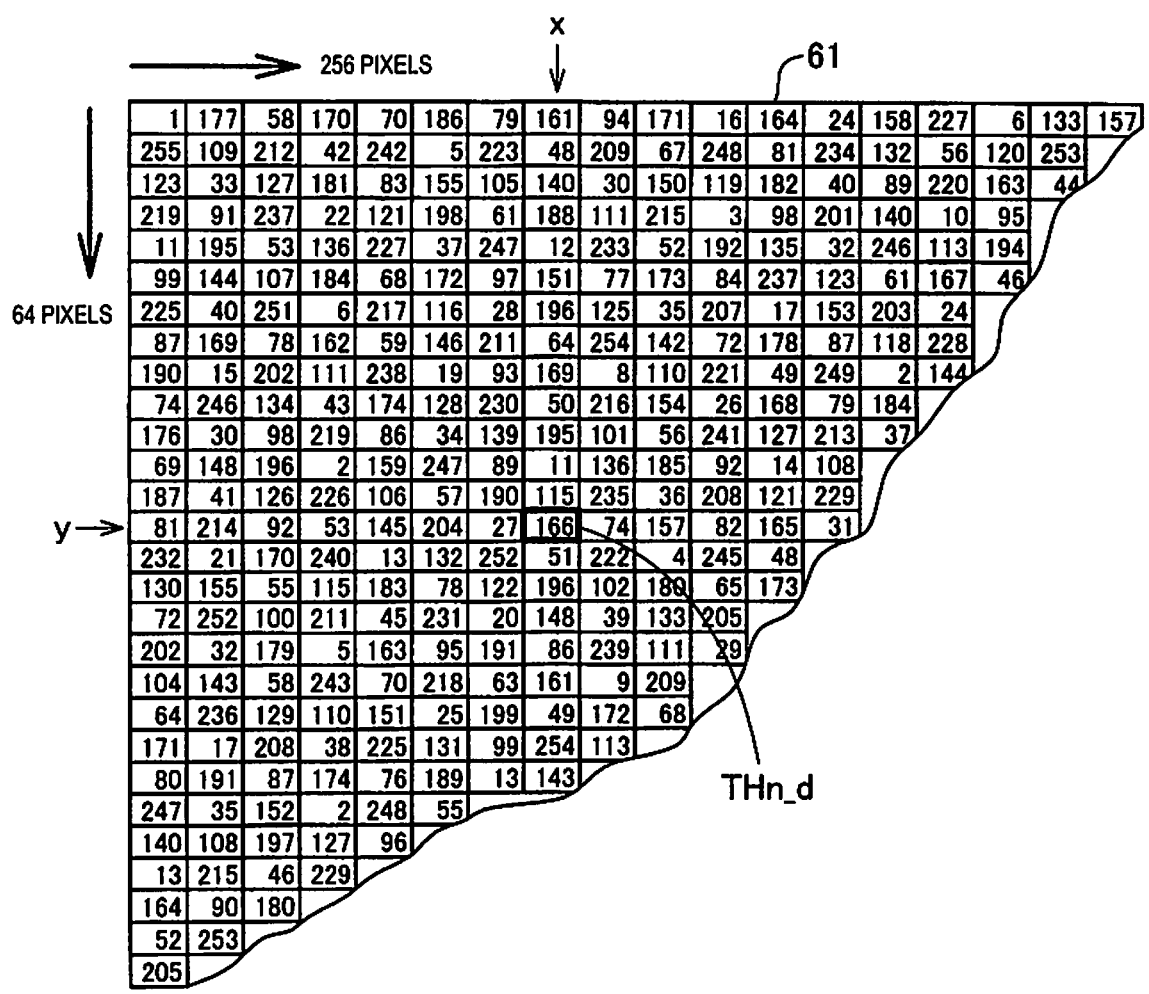
FIG. 7 is an explanatory diagram exemplifying a part of a dither mask.

The complex error diffusion method processing (step S300) according to the first embodiment is performed as follows. First, it is determined whether or not the dither determination data DCn is greater than or equal to the first threshold THn_d read from the dither mask (step S301). The first threshold THn_d is a threshold corresponding to the interest pixel location n(x,y) among a plurality of thresholds configuring the dither mask 61 stored in the EEPROM 60. An example of the dither mask 61 is illustrated in FIG. 7.

As described above, the dither mask 61 stored in the EEPROM 60 has a size of width (main scan direction) 256×length (sub-scan direction) 64, and the plurality of thresholds THn_d corresponding to the first thresholds are arranged in the dither mask. The first thresholds THn_d (hereinafter, also simply referred to as the threshold THn_d) takes values of 1 to 255 in the present embodiment. The respective thresholds THn_d are arranged such that a spatial frequency of a dot formed by comparison with the threshold has a so-called blue noise characteristic.

The blue noise characteristic of the dither mask has the largest frequency component in a high frequency region. This means that a storage location of the threshold is adjusted such that the largest frequency component is generated in the high frequency region in consideration of a human visual characteristic in which sensitivity is low in the high frequency region. If the dot is generated by using a dither mask having the blue noise characteristic, an image with excellent dot dispersiveness is obtained.

The blue noise characteristic of the dither mask is well known, and thus, detailed description thereof will be omitted. A green noise characteristic may be employed instead of the blue noise characteristic. Since the green noise characteristic has the largest frequency component on a slightly lower frequency side than a blue noise characteristic, if a pixel size is sufficiently small, a good image with no granular feeling is obtained even in the green noise characteristic. The dither mask 61 is formed to have a predetermined spatial frequency characteristic such as the blue noise characteristic and the green noise characteristic.

Figure 8A:
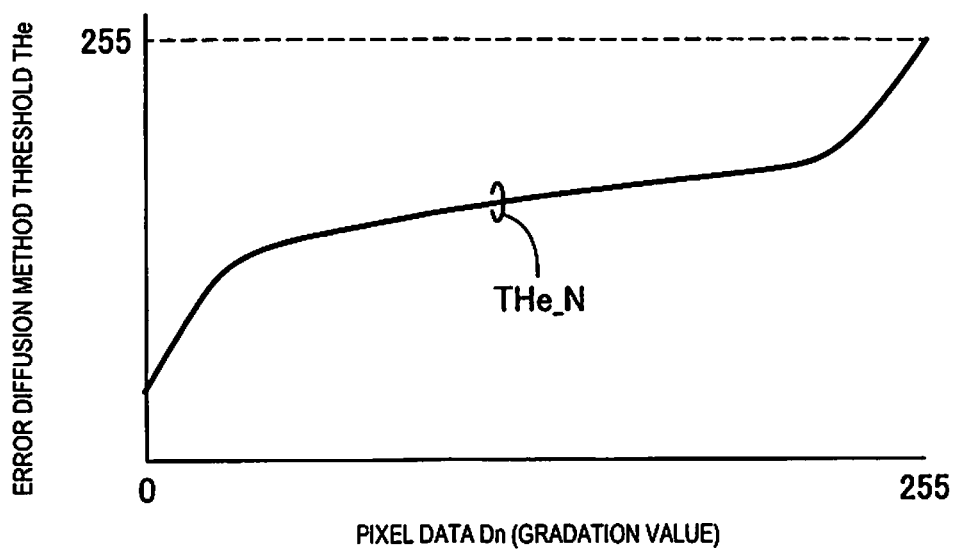
FIG. 8A is an explanatory diagram illustrating an example of determining an error diffusion method threshold according to a gradation value of image data.

In step S301, the threshold THn_d at a location corresponding to the interest pixel location n(x,y) is extracted from the dither mask 61 and is compared with the dither determination data DCn. Hereinafter, determination of comparing the dither determination data DCn with the threshold THn_d read from the dither mask is also referred to as temporary dither. FIG. 7 illustrates a state in which a value of 166 is extracted as the threshold THn_d used for the determination of the temporary dither. As a result of the determination of the temporary dither, if a gradation value of the dither determination data DCn for the interest pixel is smaller than a value of the threshold THn_d (step S301: NO), the CPU 40 subsequently compares the diffused image data DDn with an error diffusion method threshold THe corresponding to the second threshold (step S305). Here, the error diffusion method threshold THe is determined as a value corresponding to the interest pixel data Dn, as illustrated in FIG. 8A. In the example illustrated in FIG. 8A, the error diffusion method threshold THe is set as a characteristic THe_N that increases as the pixel data Dn increases. The reason why the error diffusion method threshold THe has such a characteristic is that when binarization is performed by using the error diffusion method, a binarization error is eliminated early, and generation of so-called dot formation delay, tailing, and the like is suppressed.

If it is determined in step S305 that the diffused image data DDn is larger than or equal to the error diffusion method threshold THe as a result of the determination of step S305 (step S305: YES), the dot of the interest pixel is determined to be ON (the dot is formed) (step S307), and if the gradation value of the diffused image data DDn is smaller than the error diffusion method threshold THe (step S305: NO), the dot of the interest pixel is determined to be OFF (the dot is not formed) (step S308).

Meanwhile, in the temporary dither determination in step S301, if the gradation value of the dither determination data DCn is larger than or equal to the value of the threshold THn_d (step S301: YES), the dot is determined to be ON in the same manner as in a case (step S305: YES) where the diffused image data DDn is larger than or equal to the error diffusion method threshold THe (step S307).

By executing the processing in steps S301 to S308 described above, that is, the complex error diffusion method processing (step S300), determination on whether or not a dot is formed in the interest pixel is made. The processing is performed as processing of the complex error diffusion method processing unit 45. The CPU 40 calculates a binarization error En and a diffusion error Edn by receiving the processing (step S240). The binarization error En is a difference between the diffused image data DDn and a gradation value RSLT (here, the value 255 or 0) realized as a result of ON/OFF of the dot. The binarization error is represented by Equation (2) if the binarization error is represented by an equation.

$$En=DDn(x,y)-RSLT(255 \text{ or } 0) \quad (2)$$

Generally, if a dot is not formed, the binarization error En changes in a positive direction, and if the dot is formed, the binarization error changes in a negative direction.

Figure 8B:
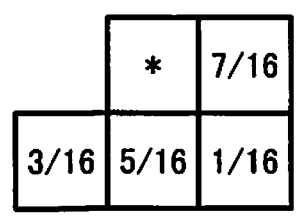
FIG. 8B is an explanatory diagram illustrating an example of an error diffusion rate around a pixel of interest.

As a result, if a negative error occurs due to the binarization processing, the dots are hard to be formed in the peripheral pixels by the error diffusion processing which will be described below, and if a positive error occurs, the dots are easily formed in the peripheral pixels by the error diffusion processing which will be described below. The error diffusion is processing of obtaining the diffusion error Edn by using following Equation (3) and distributing an error generated in the focused pixel to the peripheral pixels. The distributed error is accumulated and added to the gradation value of the interest pixel data Dn in step S210 described above. In the present embodiment, the binarization error En is distributed to the four pixels which are peripheral pixels for which ON/OFF of the dot is not determined, with weighting illustrated in FIG. 8B. That is, the binarization error is distributed as the diffusion error Edn at a rate of 7/16 for the pixel at a location (adjacent to the right) adjacent to the interest pixel in the main scan direction indicated by a "*" mark in FIG. 8B, 3/16 for the pixel at a location (lower left) adjacent in the sub-scan direction and on a side opposite to the main scan direction, 5/16 for the pixel immediately below and adjacent in the sub-scan direction, and 1/16 for the pixel at a location (lower right) adjacent in the main scan direction and the sub-scan direction. The diffusion error Edn calculated by doing so is stored in an error buffer prepared in the RAM 52.

$$Edn(x+1,y)=Edn(x+1,y)+En\times(7/16)$$

$$Edn(x-1,y+1)=Edn(x-1,y+1)+En\times(3/16)$$

$$Edn(x,y+1)=Edn(x,y+1)+En\times(5/16)$$

$$Edn(x+1,y+1)=Edn(x+1,y+1)+En\times(1/16) \quad (3)$$

After the above-described complex error diffusion method processing (step S300) and calculation of the binarization error and the diffusion error are performed (step S240), the CPU 40 performs processing of diffusing the diffusion error Edn obtained by above-described Equation (3) to each pixel around the interest pixel (step S245). Then, the CPU 40 determines whether or not the binarization processing ends for all the pixels in the image in which each halftone unit HTUij performs the halftone processing, that is, each divided image illustrated in FIG. 3 and increments the interest pixel location (x, y) until the processing for all the pixels ends, and the processing returns to step S205 to continue the above-described halftone processing. If the processing for all the pixels in the divided image ends (step S250: "YES"), the processing exits to "RETURN" and the halftone processing ends.

The halftone processing described above is performed in parallel by a plurality of halftone units HTUij as illustrated in FIG. 2. The parallel processing is to simultaneously perform at least a part of the halftone processing including the error diffusion method for image data corresponding to each divided image in each of the plurality of halftone processing units 42 realized by the CPU 40 using multiple cores.

According to the processing described above, at least a part of the dot data obtained as each halftone unit HTUij performs the halftone processing by using the error diffusion method matches the determination result by the dither method in the complex error diffusion method processing unit 45. That is, it is possible to increase a rate in which a dot data generation result (ON/OFF of the dot) by each halftone unit HTUij matches a comparison result with the thresholds arranged in the dither mask configured by a plurality of thresholds, that is, a result of a case where the dither method is used. In the dither method, even if the image is divided and processed, image quality does not degrade in a boundary region, and thus, even if the halftone processing is performed for the divided image by increasing the rate that matches the result of a case where the dither method is used, it is possible to suppress disturbance of the image quality such as generation of a pseudo contour at a boundary due to the error diffusion method or a place near the boundary, and since at least two halftone processing units simultaneously perform at least a part of the processing for at least two pieces of the image data, it is possible to speed up the halftone processing as a whole.

Specifically, according to the first embodiment, if the diffused image data DDn of the interest pixel is larger than or equal to the threshold THn_d acquired from the corresponding location of the dither mask 61 according to the temporary dither determination (step S301), a dot is formed without waiting for determination due to error diffusion. Accordingly, if the temporary dither determination result is ON, the dot is formed all the time. Here, if a case where the dither contribution degree coefficient K1 is a value of 1 is compared with a case where the dither contribution degree coefficient K1 is smaller than the value of 1, the rate in which the temporary dither determination result, that is, the determination result of step S301 becomes "YES" is reduced in the latter case more than in the former case. The rate is 80% when the dither contribution degree coefficient K1 has a value of 1, if the dither contribution degree coefficient K1 is 0.8. Among the remaining 20%, there is a pixel determined that the dot is ON and a pixel determined that the dot is OFF when the diffused image data DDn and the error diffusion method threshold THe are compared with each other in the determination in step S305, but the ON/OFF does not necessarily match the determination in step S301 when the dither contribution degree coefficient K1 has the value of 1. Accordingly, if the dither contribution degree coefficient K1 approaches the value of 1, as a whole, the rate increases in which the determination result in step S301 matches the final halftone processing result, that is, the ON/OFF of the dot.

Figure 9:
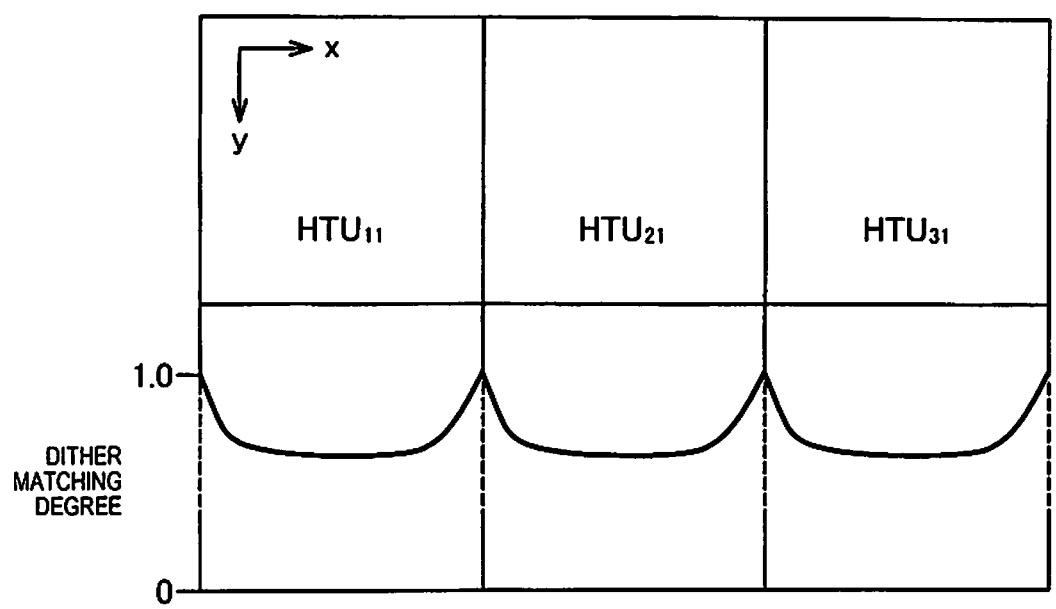
FIG. 9 is an explanatory diagram exemplifying a dither matching degree of a divided image.

The dither contribution degree coefficient K1 may be a constant value regardless of the pixel location, but in the first embodiment, the dither contribution degree coefficient K1 is set to a value close to the value of 1 as dither contribution degree coefficient is close to the boundary of the divided image processed by each halftone unit HTUij (see FIGS. 5 and 6). Thus, according to the printer 20 of the first embodiment, the rate in which ON/OFF of dot formation due to the halftone processing performed by each halftone unit HTUij matches the temporary dither determination result (step S301) increases as the dither contribution degree coefficient approaches the boundary of the divided image as illustrated in FIG. 9. Accordingly, in a location where each divided image is adjacent, presence or absence of dot formation is determined by the dither method, and a pseudo contour and the like do not occur. Meanwhile, if the dither contribution degree coefficient is far away from the boundary of the divided image, a matching degree between the final ON/OFF of the dot formation due to the halftone processing and the temporary dither determination result is reduced. Accordingly, except the boundary of each divided image, the rate increases in which the presence or absence of dot formation is determined by the error diffusion method. That is, a density error generated by the determination of the presence or absence of dot formation for one pixel is diffused to the peripheral pixels, the density error of the whole images is removed, and the distribution of the formed dots is made by reflecting the gradation value of the original image, and a high image quality can be achieved. Moreover, since the dither contribution degree coefficient K1 is gradually decreased as being far away from the boundary of the divided image, the determination by the dither method and the determination by the error diffusion method are gradually shifted, and the image disturbance due to switching and the like does not occur. Accordingly, the image is divided, each image is processed by each of the plurality of halftone units HTUij, and thereby, the image disturbance such as generation of a pseudo contour at a boundary where the original image is divided is also sufficiently suppressed while image processing is speeded up.

In the above-described embodiment, the dither contribution degree coefficient K1 is set to approach the value of 1 when approaching the boundary of the divided image. In such an embodiment, another dither contribution degree coefficient K2 set according to a magnitude of the pixel data Dn is provided, and the dither determination data DCn may be obtained by using Equation (4) when being obtained in step S230 of FIG. 4. The dither contribution degree coefficient K2 corresponds to a second contribution degree coefficient.

$$DCn \leftarrow K1 \cdot K2 \cdot Dn \quad (4)$$

Figure 10:
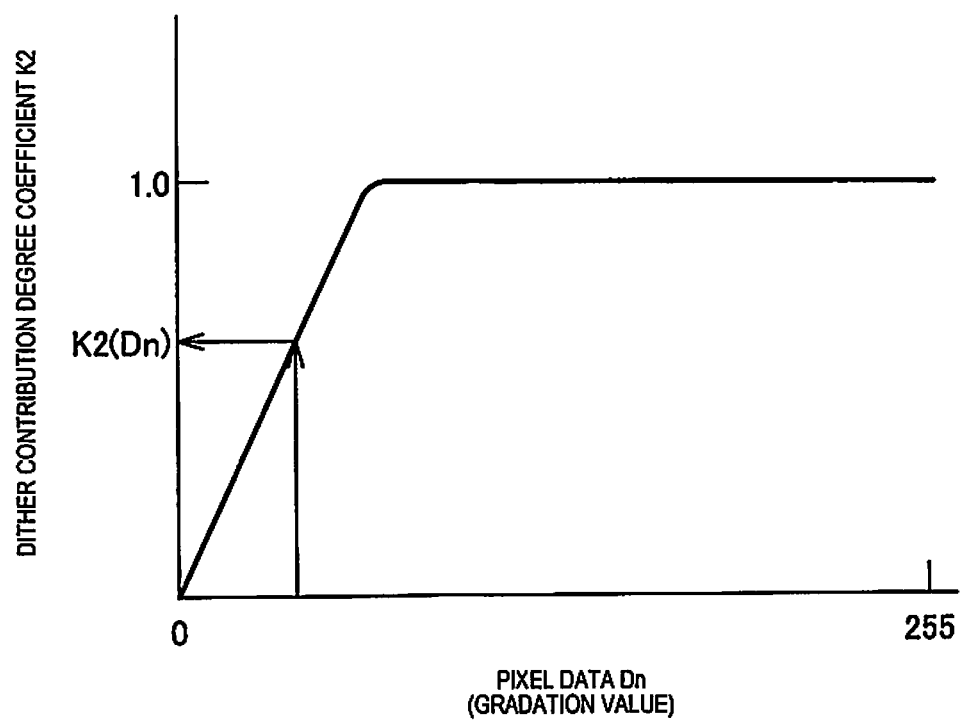
FIG. 10 is an explanatory diagram exemplifying a relation between the gradation value of the image data and the dither contribution degree coefficient.

An example of another dither contribution degree coefficient K2 is illustrated in FIG. 10. By doing so, it is possible to adjust a degree to which a comparison result with the threshold of the dither mask 61 is reflected in the ON/OFF of the dot according to the gradation value of the pixel data Dn, even in the complex error diffusion method processing (FIG. 4, step S300) illustrated in the first embodiment. If a function K3(x,y,Dn) which can be randomly set corresponding to a combination with the locations x and y in the divided image or the pixel data Dn is used instead of the dither contribution degree coefficients K1 and •K2, it is possible to set a contribution degree coefficient with a higher degree of freedom. It is possible to freely set the contribution degree coefficient as well, even if the look-up table is used instead of the function. The second contribution degree coefficient K2 does not have to be used together with the first contribution degree coefficient K1 and may be used alone. In this case, as the input gradation value increases, the input gradation value approaches the determination result of the dither method regardless of a distance to the boundary of the divided image. In FIG. 10, the dither contribution degree coefficient K2 changes continuously according to the gradation value, but the dither contribution degree coefficient K2 may not be continuous, and, for example, the dither contribution degree coefficient K2 of the first gradation value of the pixel of the divided image may be previously set to become a value lower than a value of the second gradation value having a gradation value higher than the first gradation value. In addition, in FIG. 10, the dither contribution degree coefficient K2 when the pixel data Dn has the value of 0 starts from a value of 0, but when the pixel data Dn approaches the value of 0, when a pseudo contour at a boundary of parallel processing becomes a problem, the dither contribution degree coefficient K2 when the pixel data Dn is the value of 0 starts from the value of approximately 0.5 and is set to reach the value of 1 by gradually increasing at a half slope, and others may be done. By doing so, a matching rate with a temporary dither when the pixel data Dn approaches the value of 0 can become higher than the rate in FIG. 10, and generation of the pseudo contour and the like can be suppressed.

B. Second Embodiment

Figure 11:
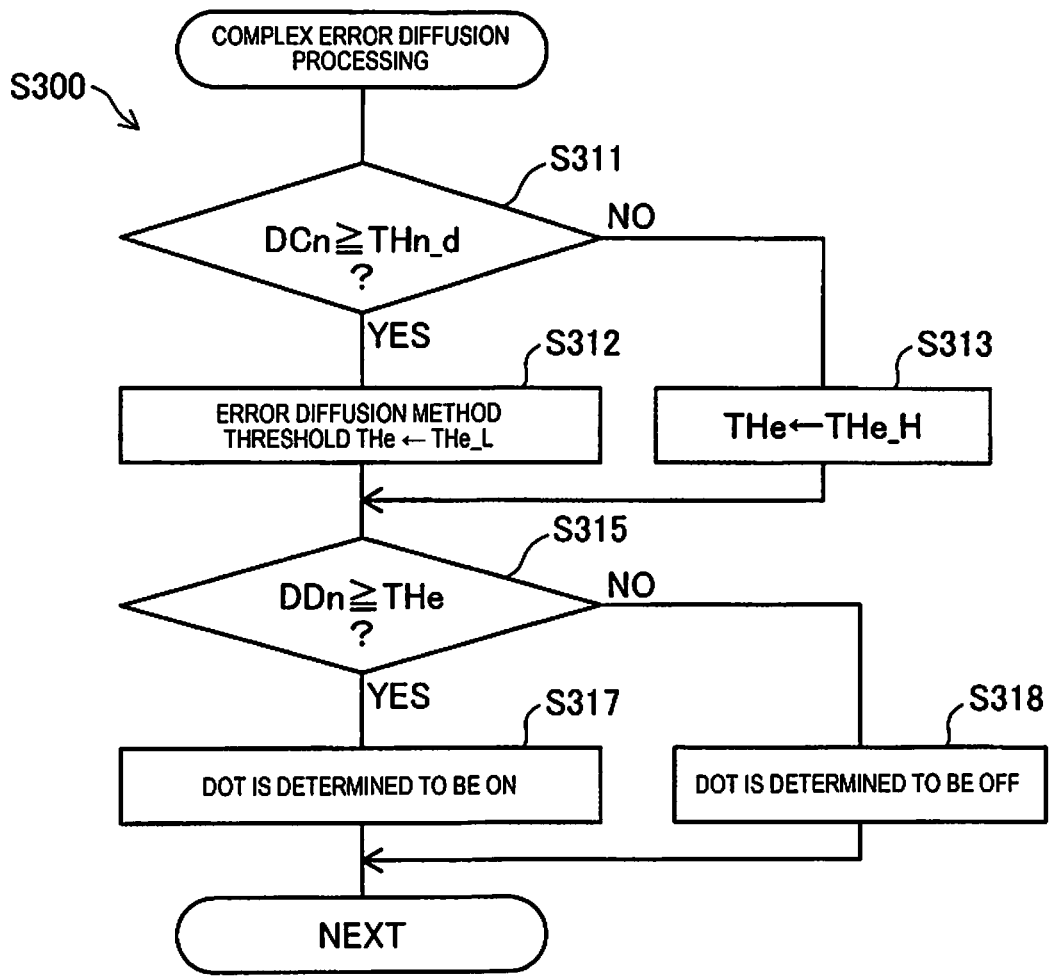
FIG. 11 is a flowchart illustrating content of complex error diffusion method processing according to a second embodiment.

A second embodiment will be described. A printer 20 according to the second embodiment has the same apparatus configuration as the apparatus configuration of the first embodiment, and processing of a complex error diffusion method processing unit 45 is different. The processing of the complex error diffusion method processing unit 45 according to the second embodiment is illustrated in FIG. 11. In the same manner as in the first embodiment, after the input of the image data (step S110), the color conversion processing (step S120), and the processing of the image division (step S130) are performed, the plurality of halftone units HTUij perform the halftone processing in parallel for the image data of the respective divided images. The outline is illustrated in FIG. 4, and in the second embodiment has different content of the complex error diffusion method processing (step S300).

In the second embodiment, the following processing is performed as the complex error diffusion method processing. First, the CPU 40 performs temporary dither processing in the same manner as in the first embodiment (step S311). That is, magnitude relationships between the dither determination data DCn and the value of the threshold THn_d corresponding to the pixel location n(x,y) of an interest pixel among the plurality of thresholds configuring the dither mask 61 stored in the EEPROM 60 are compared.

If a gradation value of the interest pixel data Dn is larger than or equal to a value of the threshold THn_d as a result of the temporary dither processing (step S311: YES), the error diffusion method threshold THe used for the error diffusion method is set to a lower threshold THe_L (step S312). Meanwhile, if the dither determination data DCn of the interest pixel is smaller than the value of the threshold THn_d (step S311: NO), the error diffusion method threshold THe used for the error diffusion method is set to an upper threshold THe_H (step S313). As such, in the present embodiment, the error diffusion method threshold THe (hereinafter, also simply referred to as a threshold THe) used for the error diffusion method changes based on the result of the temporary dither processing. Setting of such a threshold THe is performed with reference to the error diffusion threshold table 62 stored in the EEPROM 60.

Figure 12:
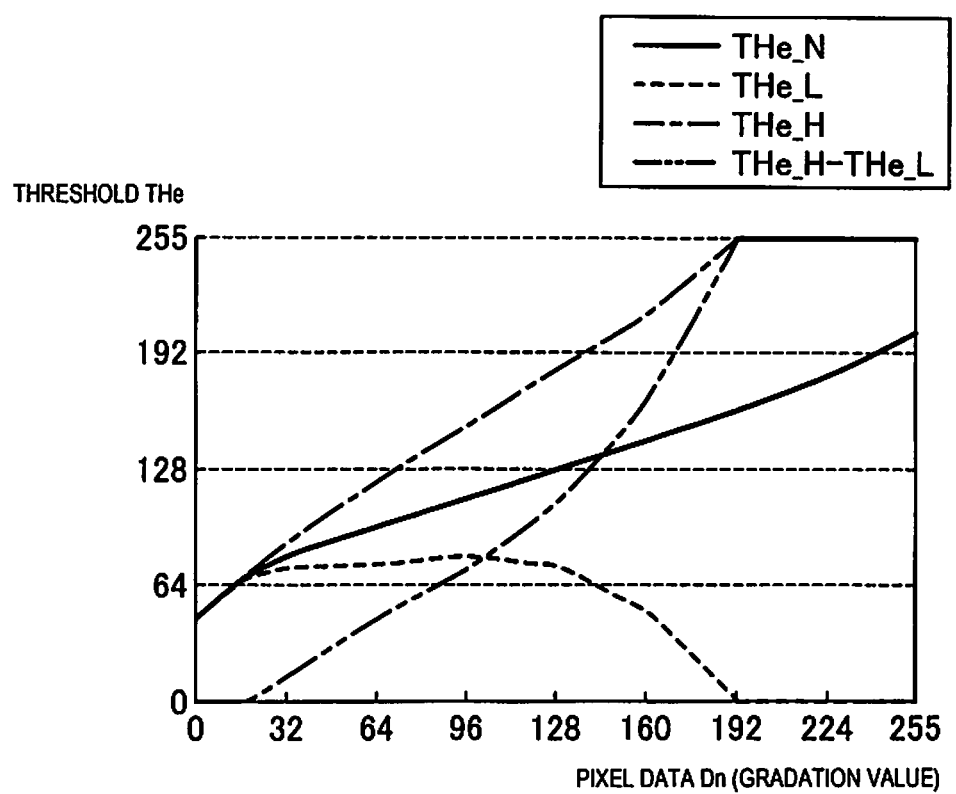
FIG. 12 is an explanatory diagram illustrating an example of an upper threshold and a lower threshold set as the gradation value of the image data and the error diffusion method threshold.

A specific example of the error diffusion threshold table 62 is conceptually illustrated in FIG. 12. FIG. 12 illustrates an example of the upper threshold THe_H and the lower threshold THe_L set in the error diffusion method threshold THe in steps S312 and S313. An error diffusion method threshold THe_N indicated by a solid line in FIG. 12 is the same as the error diffusion method threshold used in the first embodiment. What is indicated by a two-point chain line in FIG. 12 is a difference (hereinafter, also referred to as ΔTHe) between the upper threshold THe_H and the lower threshold THe_L. When the gradation value of the interest pixel data Dn is in a range of 0 to 16, the threshold difference ΔTHe is a value of 0, and values of the upper threshold THe_H and the lower threshold THe_L match the threshold THe_N. When the gradation value is in a range of 16 to 192, the upper threshold THe_H and the lower threshold THe_L are set such that the threshold difference ΔTHe is increased as the gradation value increases by increasing the upper threshold THe_H to a value larger than the threshold THe_N and decreasing the lower threshold THe_L to a value smaller than the threshold THe_N. When the gradation value is in a range of 192 to 255, the upper threshold THe_H and the lower threshold THe_L are set such that the threshold difference ΔTHe becomes constant at the value of 255.

After the error diffusion method threshold THe is competed with the upper threshold THe_H or the lower threshold THe_L, the CPU 40 compares the diffused image data DDn with the error diffusion method threshold THe set in step S312 or step S313 (step S136). As a result, if the diffused image data DDn is larger than or equal to the error diffusion method threshold THe (step S136: YES), a dot of an interest pixel is determined to be ON (step S317), and if the diffused image data DDn is smaller than the error diffusion method threshold THe (step S136: NO), the dot of the interest pixel is determined to be OFF (step S318).

The complex error diffusion method processing (step S300) according to the second embodiment is as described above. If the processing ends, the step S240 or the processing subsequent to step S240 of FIG. 4 is performed, and the halftone processing for all pixels of the respective divided images is performed in parallel.

The halftone processing including the above-described complex error diffusion method processing will be described below. As described above, in the processing of steps S311 to S313, if the dither determination data DCn is larger than or equal to the threshold THn_d acquired from the dither mask 61, the error diffusion method threshold THe is set to the lower threshold THe_L, and if the gradation value of the interest pixel data Dn is smaller than the value of the threshold THn_d, the threshold THe is set to the upper threshold THe_H. At this time, the difference ΔTHe (=THe_H−THe_L) between both thresholds becomes a value larger than or equal to 0.

Here, a case where the threshold difference ΔTHe is a value of 0 (THe_H=THe_L) is considered. In this case, the result of the temporary dither processing does not affect the threshold THe, and the processing of steps S311 to S313 does not affect the final determination of ON/OFF of the dot. That is, in this case, it means that the final ON/OFF of the dot is determined only by the error diffusion method in the complex error diffusion method processing (step S300).

Next, a case where the threshold difference ΔTHe is larger than 0 (THe_H>THe_L) is considered. In this case, if it is determined that the dither determination data DCn is larger than or equal to a value of the threshold THn_d, the CPU 40 sets the error diffusion method threshold THe to the relatively small lower threshold THe_L. Meanwhile, if it is determined that the dither determination data DCn is smaller than the value of the threshold THn_d, the CPU sets the error diffusion method threshold THe to the relatively large upper threshold THe_H. As a result, as the difference ΔTHe is increased, the determination result of step S311 and the determination result of step S315 easily match each other. Moreover, also in the second embodiment, since the interest pixel data Dn is corrected by the dither contribution degree coefficient K1 (step S230 of FIG. 4), whether or not a dot is finally formed is controlled as follows in the same manner as in the first embodiment:

(A) If the relationships illustrated in FIG. 5 and FIG. 6 are adopted, a degree in which a comparison result with a threshold of the dither mask is finally reflected in the final ON/OFF of the dot increases around the boundary of the divided region, (B) if the relationship illustrated in FIG. 12 is adopted, when the gradation value of the interest pixel is small, ON/OFF of the dot approaches a determination result of an error diffusion method, and as the gradation value of the interest pixel increases, ON/OFF of the dot approaches a comparison result with the gradation value of the dither mask 61. In the second embodiment, by fixing the coefficient K1 to the value of 1 or the like, a contribution degree control made by the first contribution degree coefficient K1 can be omitted. If the first contribution degree coefficient is omitted, the contribution degree cannot be variable according to the pixel location, but the same effect as when the coefficient K1 is set to a constant value regardless of the pixel location in the first embodiment can be realized without using the first contribution degree coefficient K1.

Therefore, according to the second embodiment, the same effects as the first embodiment are obtained, and furthermore, the dot is easily formed in the low gradation region by using the error diffusion method, and an image excellent in dot dispersiveness can be formed. In the present embodiment, since a change in the contribution degree coefficients of a dithering method element and the error diffusion method element is hard to be visually recognized in the printing result, it is possible to suppress a decrease in the printing image caused by the change in the contribution degree coefficient of the dithering method element and the error diffusion method element in the same printing image. Particularly, in the present embodiment, since the dither mask 61 having blue noise characteristics excellent in granularity of printing image quality is adopted, a change in the contribution degree coefficient of the error diffusion method element excellent in granularity of the same printing image can be seen more smoothly. Even when the dither mask 61 does not have the blue noise characteristics, if a control degree of easiness of dot formation by using the error diffusion method is gradually changed based on a magnitude of the gradation value, it is possible to smoothly change the contribution degree coefficient of the dithering method element and the error diffusion method element according to the gradation value of the image data.

Figure 13:
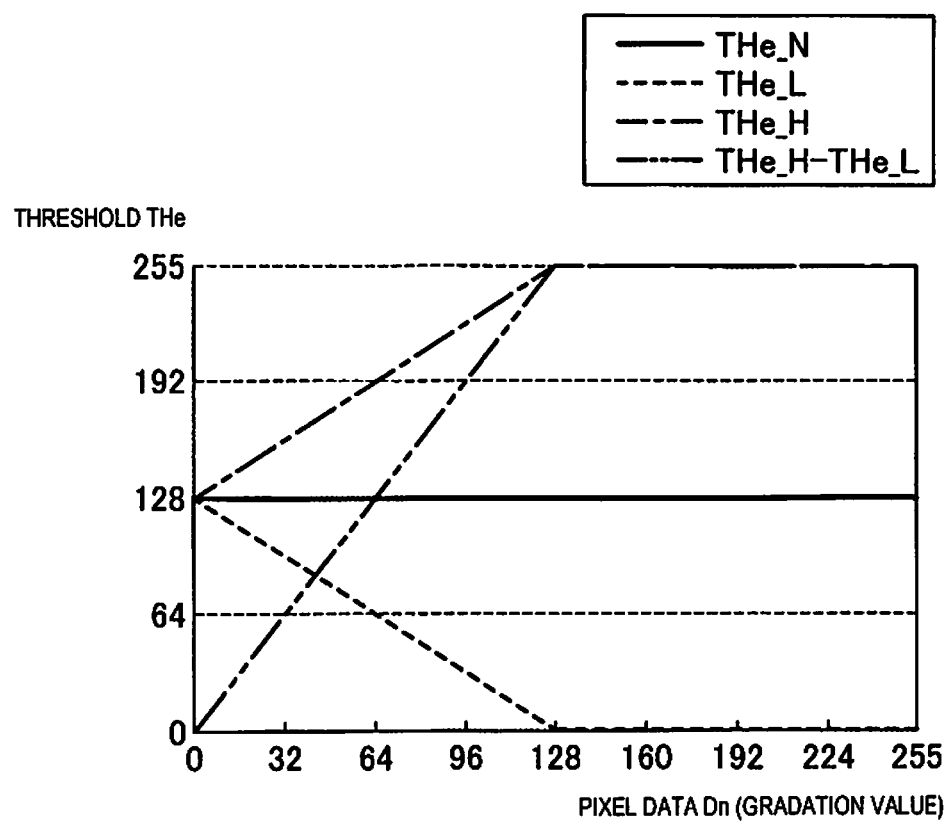
FIG. 13 is an explanatory diagram illustrating another example of the upper threshold and the lower threshold set as the gradation value of the image data and the error diffusion method threshold.

The error diffusion threshold table 62 may maintain ΔTHe to be larger than the value of 0 even if the pixel data Dn approaches the value of 0, without being limited to the characteristics illustrated in FIG. 12. The error diffusion threshold table may have the characteristics illustrated in FIG. 13. The example illustrated in FIG. 13 is different from FIG. 12 in that an increasing rate of the upper threshold THe_H according to the increase of the gradation value and a decreasing rate of the lower threshold THe_L are large and the gradation value is constant at a predetermined value or larger.

If this point is viewed as the threshold difference ΔTHe, the difference ΔTHe becomes a value of 0 when the gradation value is 0, increases as the gradation value increases, becomes a value of 255 when the gradation value is 128, and thereafter, the difference is maintained constant at the value of 255 until the gradation value reaches 255.

When the error diffusion threshold table 62 has such characteristics, if the gradation value of the pixel data Dn of an interest pixel is larger than 0, the difference ΔTHe takes a valid value and the amount of changes thereof increases, and thereby, the dithering method element appears in all the gradation values. Particularly, the dithering method element becomes extremely strong in a range where the gradation value is larger than or equal to 128. In the example of FIG. 13, when the threshold difference ΔTHe is the value of 255, the final ON/OFF of the dot is determined substantially by only the dithering method element. If the lower threshold THe_L is set to a negative value or the like and the threshold difference ΔTHe is further increased, the final ON/OFF of the dot can be completely determined only by the dithering method element.

C. Other Embodiments (1) Variation of Image Division:

In the embodiment described above, an image is divided into a images in the main scan direction and b images in the sub-scan direction, but the number of divided image may be any number if it is plural. In addition, if the number of complex error diffusion method processing units 45 corresponding to the number of divided images is prepared and processed in parallel, it is possible to speed up the halftone processing, but the number of divided images and the number of halftone units HTUij may not necessarily match each other. Even if there are no halftone units HTUij as many as the number of divided images, the time required for the entire processing can be shortened. In addition, the halftone units HTUij operating in parallel may not finish processing at the same time. The processing may not be started at the same time.

Figure 14:
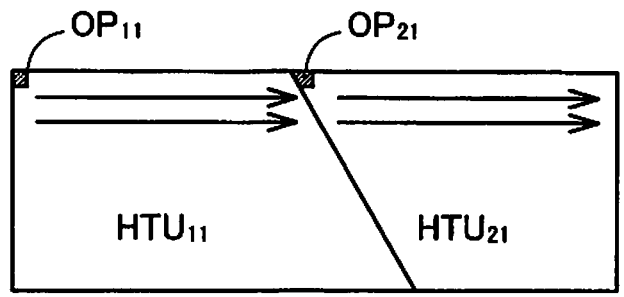
FIG. 14 is an explanatory diagram illustrating another example of a division location of an image division.
Figure 15:
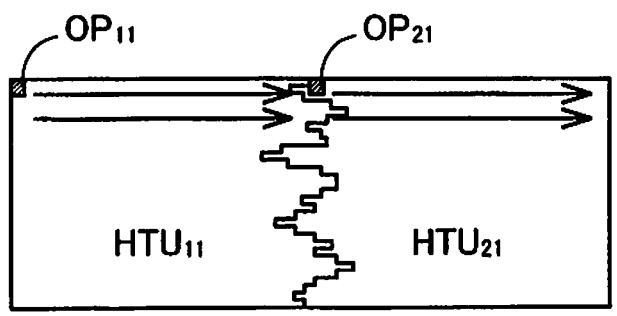
FIG. 15 is an explanatory diagram illustrating still another example of the division location of the image division.

Shapes of images to be divided do not have to be the same in all the divided images and may be different as exemplified in, for example, FIG. 14 and FIG. 15. Particularly, a boundary of the image does not have to be parallel in the main scan direction and the sub-scan direction and may be tilted as illustrated in FIG. 14 or may be shifted for each raster as illustrated in FIG. 15. Since a location of the boundary is shifted for each raster in the latter case, it is difficult to visually recognize a pseudo contour or the like. When the division of the image is not limited to a rectangle, coordinates of the pixel OPij at a start point of processing in each raster may be previously prepared in a table or the like, and the processing may start with reference to this.

In the above-described embodiment, the image to be processed is input and divided in the printer 20, but the image is divided by an external computer or the like, and image data of the divided image may be input.

Figure 16:
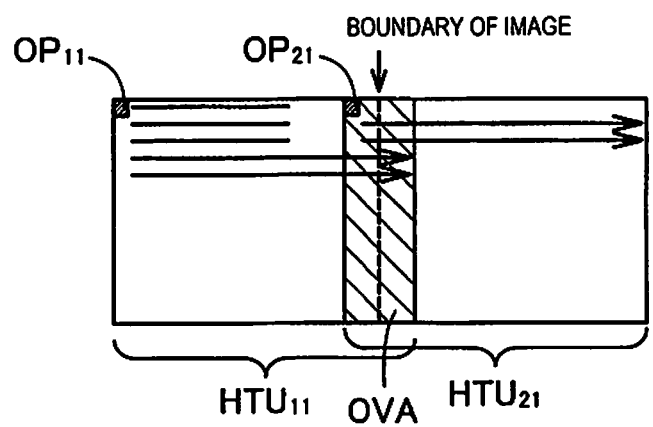
FIG. 16 is an explanatory diagram illustrating a case where regions processed by two halftone units overlap each other.

(2) Processing Range of Halftone Unit HTUij:

The halftone unit HTUij that performs halftone processing including complex error diffusion method processing may perform the halftone processing beyond a range of a divided image. This example is illustrated in FIG. 16. In this example, the divided image has a rectangular shape, and each halftone unit HTUij performs the halftone processing over a range beyond a boundary of the divided image. In this case, an overlap region OVA in which processing is performed by both the halftone units HTUij exists at a boundary between the two halftone units HTUij, but only an error diffusion is performed along with the halftone processing in a range which extends from the divided image that each halftone unit HTUij is in charge of, and ON/OFF of a dot may not be concerned. By doing so, error diffusion can be performed more appropriately for the range of the divided image.

In the above-described embodiment, the error diffusion method threshold THe corresponding to the second threshold is given as a function of the interest pixel data Dn as illustrated in FIG. 8A and others, but the error diffusion method threshold may be treated as a fixed value such as a value of 127.

(3) Variation of Dither Contribution Degree Coefficient:

In the above-described embodiment, the contribution degree coefficient K1 corresponding to the first contribution degree coefficient and the contribution degree coefficient K2 corresponding to the second contribution degree coefficient are illustrated as the dither contribution degree coefficients, and other contribution degree coefficient may be adopted as the dither contribution degree coefficient. For example, in the second embodiment, the dither contribution degree coefficient can be increased as the threshold difference ΔTHe is increased. In this case, in order to obtain the difference ΔTHe corresponding to the desirable contribution degree coefficient K2, dot data may be actually generated, and whether or not a dot is formed at a desirable ratio may be measured to adjust the contribution degree coefficient. Alternatively, randomly changing the contribution degree coefficient for a location or the pixel data Dn may be adopted. In addition, these may be combined to be used. Furthermore, the dither contribution degree coefficient may have a different value depending on a color of ink to be processed.

In the above-described embodiment, for example, the contribution degree coefficient is obtained by multiplying the pixel data Dn by the contribution degree coefficient K1 as illustrated in steps S220 to S230 in FIG. 4, but the same result is obtained by dividing the threshold acquired from the dither mask 61 by the contribution degree coefficient K1 instead of this. When the determination data DCn is obtained, the contribution degree coefficient set to a negative value may be added to the pixel data Dn. Also by this, as the contribution degree coefficient approaches the value of 0, the determination data DCn increases, and a matching rate with the dither increases. The same contribution degree coefficient may be given as a numerical value for adjusting the first threshold, and this may be subtracted from the first threshold.

(4) Use as Printing Apparatus:

In the above-described embodiment, the printer 20 is illustrated as a so-called multifunction machine that performs halftone processing by itself, but a driver of a computer performs the halftone processing including the above-described complex error diffusion method processing and may be realized as an aspect in which printing is performed by transmitting the obtained dot data to the printer 20. The printer 20 is not limited to the so-called serial printer described above and may be a line printer, a page printer, or the like. The printing method is not limited to the ink jet method and may be a thermal transfer, a laser printer, or the like. The color of ink to be printed may not be colorful, and a single color like a monochrome printer may be printed. A medium to be printed is not limited to paper and may be a curved surface such as a film, a sheet, a bottle, or a bolt. Of course, printing is not always necessary to be performed, and an image processing method may be implemented alone.

D. Other Aspects

1. It is characterized in that an image processing apparatus according to the present disclosure is an image processing apparatus which performs halftone processing of an image and which includes an image receiving unit which receives a plurality of pieces of image data corresponding to a plurality of divided images obtained by dividing the image, and a plurality of halftone processing units which perform halftone processing of processing each of the plurality of pieces of image data to generate dot data representing presence or absence of dot formation and in which at least two halftone processing units simultaneously perform at least a part of processing for the at least two image data, in which each of the halftone processing units performs complex error diffusion method processing of matching at least a part of the dot data obtained by performing halftone processing using an error diffusion method for a gradation value in which an error diffusion of each pixel of the divided image is completed with a determination result of a dither method. By doing so, at least a part of halftone processing of an image can be performed in parallel, and in the processing, at least a part of dot data obtained by performing the halftone processing by using an error diffusion method for the error diffused gradation value of each pixel matches a determination result of the dither method, and thereby, it is possible to obtain an advantage of prioritizing the determination result of the dither method. As the advantage, it is possible to suppress generation or the like of a pseudo contour around a boundary of a divided image.

2. In the image processing apparatus, the complex error diffusion method processing may be processing in which first thresholds arranged in a dither mask configured by a plurality of thresholds are sequentially compared with gradation values of each pixel included in image data corresponding to the divided image, when the gradation value of the pixel is higher in comparison with a corresponding first threshold, the dot data is generated by forming a dot, and when the gradation value of the pixel is not higher in the comparison with a corresponding first threshold, the dot data is generated according to a result from comparing the error diffused gradation value with a predetermined second threshold. By doing so, it is possible to easily increase a rate at which a comparison result of an error diffusion method matches a comparison result of a dither method.

3. In the image processing apparatus, the complex error diffusion method processing may be processing in which, the first thresholds arranged in a dither mask configured by a plurality of thresholds may be sequentially compared with gradation values of each pixel included in image data corresponding to the divided image, when the gradation value of the pixel is larger than or equal to a corresponding first threshold, a second threshold used in the halftone processing using the error diffusion method may be set to a value smaller than that when the gradation value of the pixel is smaller than a corresponding first threshold, and in the halftone processing using the error diffusion method, the error diffused gradation value may be compared with the set second threshold and the dot data may be generated. Also by doing so, it is easy to increase a rate at which a comparison result of an error diffusion method matches a comparison result of a dither method.

4. In the image processing apparatus, when the gradation values of each pixel of the divided image are compared with the first thresholds in the determination in the dither method, a contribution degree coefficient which makes the gradation values of each pixel relatively smaller than the first thresholds may be provided. By doing so, a rate at which a gradation value of a pixel is larger than or equal to a first threshold in a determination of a dither method can be relatively reduced by a contribution degree coefficient, and thereby, it is possible to set a rate at which a comparison result of an error diffusion method matches a comparison result of a dither method.

5. In the image processing apparatus, the contribution degree coefficient may be previously set such that a value at a first point adjacent to a divided boundary of the divided image becomes a value higher than a value at a second point separated from the boundary more than the first point. By doing so, by being separated from a divided boundary of a divided image using a contribution degree coefficient, a rate at which a generation result of dot data matches a result of comparison with a first threshold can be adjusted by using a contribution degree coefficient.

6. In the image processing apparatus, the contribution degree coefficient may be previously set such that a value of the first gradation value of the pixel of the divided image becomes a value lower than a value of the second gradation value having a higher gradation value than the first gradation value. By doing so, it is possible to adjust a rate at which a generation result of dot data matches a result of comparison with a first threshold by using a contribution degree coefficient, according to a gradation value of a pixel of a divided image.

7. In the image processing apparatus, the contribution degree coefficient may be set to a value obtained by multiplying a first contribution degree coefficient previously set such that a value at a first point adjacent to a divided boundary of the divided image becomes a value higher than a value at a second point separated from the boundary more than the first point by a second contribution degree coefficient previously set such that a value in a first gradation value of the pixel of the divided image becomes a value lower than a value in a second gradation value having a higher gradation value than the first gradation value. By doing so, it is possible to adjust a rate at which a generation result of dot data matches a result of comparison with a first threshold, according to a separation from a boundary of a divided image and a gradation value of a pixels of a divided image.

8. In the image processing apparatus, the image receiving unit may receive image data of the image and divide the received image into a plurality of image data corresponding to the plurality of divided images.

9. In the image processing apparatus, a boundary shape of a divided image may be one of (1) a shape along directions respectively parallel to a direction and another direction intersecting the direction in which the halftone processing is performed for the divided image, (2) a shape along a direction oblique to at least one of a direction and another direction intersecting the direction in which the halftone processing is performed for the divided image, and (3) a shape that randomly changes in a direction in which the halftone processing is performed for the divided image. Any of the divisions can be processed in the same way, but in a case of (2) or (3), a location of a boundary changes, and thus, it is difficult to visually recognize even if deterioration of image quality such as generation of a pseudo contour at the boundary occurs.

10. In the image processing apparatus, a range processed by one of the plurality of halftone processing units may be wider than a size of the divided image. By doing so, there is a region where a plurality of halftone processing units overlap each other, and thus, it is possible to diffuse an error using an error diffusion method beyond a boundary of a divided image, and to make it difficult to cause image quality to be deteriorated due to deviation of an error.

11. A printing apparatus which prints a multi-gradation image according to the present disclosure includes an image receiving unit which receives a plurality of pieces of image data corresponding to a plurality of divided images obtained by dividing the image, a plurality of halftone processing units which perform halftone processing of processing each of the plurality of pieces of image data to generate dot data representing presence or absence of dot formation and in which at least two halftone processing units simultaneously perform at least a part of processing for the at least two pieces of image data, and a printing unit that ejects ink droplets on a printing medium to form an image according to the dot data. Here, each of the halftone processing units may perform complex error diffusion method processing of matching at least a part of the dot data obtained by performing halftone processing using an error diffusion method for a gradation value in which an error diffusion of each pixel of the divided image is completed with a determination result of a dither method.

The printing apparatus divides an image and simultaneously processes at least a part of the images to perform printing, and thereby, time required to print the image can be shortened. Since a rate at which a comparison result of an error diffusion method matches a result of comparison with a dither method can be increased, it is possible to suppress deterioration of image quality due to limitation of a range of an error diffusion.

12. An image processing method of performing halftone processing of an image according to the present disclosure includes receiving a plurality of pieces of image data corresponding to a plurality of divided images obtained by dividing the image, and providing a plurality of halftone processing units which perform halftone processing of each of the plurality of pieces of image data to generate dot data representing presence or absence of dot formation and making at least two halftone processing units simultaneously perform at least a part of halftone processing for the at least two pieces of image data. Here, the halftone processing may be complex error diffusion method processing of matching at least a part of the dot data obtained by performing halftone processing using an error diffusion method for a gradation value in which an error diffusion of each pixel of the divided image is completed with a determination result of a dither method. According to the image processing method, the same operation and effect as the above-described image processing apparatus can be obtained.

The present disclosure is not limited to the above-described embodiments and can be implemented in various configurations without departing from the scope of the present disclosure. For example, technical features of the embodiments corresponding to the technical features in the respective forms described in the section of the summary of the disclosure can be replaced or combined as appropriate to solve a part or all of the problems described above, or to achieve a part or all of the effects described above. If the technical features are not described as essential in the present specification, the technical features can be removed as appropriate. For example, a part of a configuration realized by hardware in the above embodiment can be realized by software. At least a part of the configuration realized by the software can also be realized by a discrete circuit configuration.

What is claimed is:

1. An image processing apparatus which performs halftone processing of an image, the image processing apparatus comprising:
a processor configured to execute a plurality of units including
an image receiving unit which receives a plurality of pieces of image data corresponding to a plurality of divided images obtained by dividing the image; and
a plurality of halftone processing units which perform halftone processing of processing each of the plurality of pieces of image data to generate dot data representing presence or absence of dot formation and in which at least two halftone processing units simultaneously perform at least a part of processing for the at least two pieces of image data, wherein
each of the halftone processing units performs complex error diffusion method processing of matching at least a part of the dot data obtained by performing halftone processing using an error diffusion method for a gradation value in which an error diffusion of each pixel of the divided image is completed with a determination result of a dither method,
a boundary shape of a divided image is one of
(1) a shape along directions respectively parallel to a direction and another direction intersecting the direction in which the halftone processing is performed for the divided image,
(2) a shape along a direction oblique to at least one of a direction and another direction intersecting the direction in which the halftone processing is performed for the divided image, and
(3) a shape that randomly changes in a direction in which the halftone processing is performed for the divided image.

2. The image processing apparatus according to claim 1, wherein
the complex error diffusion method processing is processing in which first thresholds arranged in a dither mask configured by a plurality of thresholds are sequentially compared with gradation values of each pixel included in image data corresponding to the divided image,
when the gradation value of the pixel is higher in comparison with a corresponding first threshold, the dot data is generated by forming a dot, and
when the gradation value of the pixel is not higher in the comparison with a corresponding first threshold, the dot data is generated according to a result from comparing the error diffused gradation value with a predetermined second threshold.

3. The image processing apparatus according to claim 1, wherein
in the complex error diffusion method processing, first thresholds arranged in a dither mask configured by a plurality of thresholds are sequentially compared with gradation values of each pixel included in image data corresponding to the divided image,
when the gradation value of the pixel is larger than or equal to a corresponding first threshold, a second threshold used in the halftone processing using the error diffusion method is set to a value smaller than that when the gradation value of the pixel is smaller than a corresponding first threshold, and
in the halftone processing using the error diffusion method, the error diffused gradation value is compared with the set second threshold and the dot data is generated.

4. The image processing apparatus according to claim 1, wherein
the complex error diffusion method processing is processing in which first thresholds arranged in a dither mask configured by a plurality of thresholds are sequentially compared with gradation values of each pixel included in image data corresponding to the divided image,
when the gradation value of the pixel is higher in comparison with a corresponding first threshold, the dot data is generated by forming a dot, and
when the gradation value of the pixel is not higher in the comparison with a corresponding first threshold, the dot data is generated according to a result from comparing the error diffused gradation value with a predetermined second threshold, and
when the gradation values of each pixel of the divided image are compared with the first thresholds in the determination in the dither method, a contribution degree coefficient which makes the gradation values of each pixel relatively smaller than the first thresholds is provided.

5. The image processing apparatus according to claim 1, wherein
the complex error diffusion method processing is processing in which first thresholds arranged in a dither mask configured by a plurality of thresholds are sequentially compared with gradation values of each pixel included in image data corresponding to the divided image,
when the gradation value of the pixel is higher in comparison with a corresponding first threshold, the dot data is generated by forming a dot, and
when the gradation value of the pixel is not higher in the comparison with a corresponding first threshold, the dot data is generated according to a result from comparing the error diffused gradation value with a predetermined second threshold,
when the gradation values of each pixel of the divided image are compared with the first thresholds in the determination in the dither method, a contribution degree coefficient which makes the gradation values of each pixel relatively smaller than the first thresholds is provided, and
the contribution degree coefficient is previously set such that a value at a first point adjacent to a divided boundary of the divided image becomes a value higher than a value at a second point separated from the boundary more than the first point.

6. The image processing apparatus according to claim 1, wherein the complex error diffusion method processing is processing in which first thresholds arranged in a dither mask configured by a plurality of thresholds are sequentially compared with gradation values of each pixel included in image data corresponding to the divided image, when the gradation value of the pixel is higher in comparison with a corresponding first threshold, the dot data is generated by forming a dot, and when the gradation value of the pixel is not higher in the comparison with a corresponding first threshold, the dot data is generated according to a result from comparing the error diffused gradation value with a predetermined second threshold, when the gradation values of each pixel of the divided image are compared with the first thresholds in the determination in the dither method, a contribution degree coefficient which makes the gradation values of each pixel relatively smaller than the first thresholds is provided, and the contribution degree coefficient is previously set such that a value of the first gradation value of the pixel of the divided image becomes a value lower than a value of the second gradation value having a higher gradation value than the first gradation value.

7. The image processing apparatus according to claim 1, wherein the complex error diffusion method processing is processing in which first thresholds arranged in a dither mask configured by a plurality of thresholds are sequentially compared with gradation values of each pixel included in image data corresponding to the divided image, when the gradation value of the pixel is higher in comparison with a corresponding first threshold, the dot data is generated by forming a dot, and when the gradation value of the pixel is not higher in the comparison with a corresponding first threshold, the dot data is generated according to a result from comparing the error diffused gradation value with a predetermined second threshold, when the gradation values of each pixel of the divided image are compared with the first thresholds in the determination in the dither method, a contribution degree coefficient which makes the gradation values of each pixel relatively smaller than the first thresholds is provided, and the contribution degree coefficient is set to a value obtained by multiplying a first contribution degree coefficient previously set such that a value at a first point adjacent to a divided boundary of the divided image becomes a value higher than a value at a second point separated from the boundary more than the first point by a second contribution degree coefficient previously set such that a value in a first gradation value of the pixel of the divided image becomes a value lower than a value in a second gradation value having a higher gradation value than the first gradation value.

8. The image processing apparatus according to claim 1, wherein the image receiving unit receives image data of the image and divides the received image into a plurality of image data corresponding to the plurality of divided images.

9. The image processing apparatus according to claim 1, wherein one of the plurality of halftone processing units performs the halftone processing on one of the plurality of pieces of image data and a part of an adjacent one of the plurality of pieces of image data, and the adjacent one is adjacent to the one of the plurality of pieces of image data.

10. A printing apparatus which prints a multi-gradation image, the printing apparatus comprising:

a processor configured to execute a plurality of units including an image receiving unit which receives a plurality of pieces of image data corresponding to a plurality of divided images obtained by dividing the image;

a plurality of halftone processing units which perform halftone processing of processing each of the plurality of pieces of image data to generate dot data representing presence or absence of dot formation and in which at least two halftone processing units simultaneously perform at least a part of processing for the at least two pieces of image data; and a printing unit that ejects ink droplets on a printing medium to form an image according to the dot data, wherein each of the halftone processing units performs complex error diffusion method processing of matching at least a part of the dot data obtained by performing halftone processing using an error diffusion method for a gradation value in which an error diffusion of each pixel of the divided image is completed with a determination result of a dither method, a boundary shape of a divided image is one of (1) a shape along directions respectively parallel to a direction and another direction intersecting the direction in which the halftone processing is performed for the divided image, (2) a shape along a direction oblique to at least one of a direction and another direction intersecting the direction in which the halftone processing is performed for the divided image, and (3) a shape that randomly changes in a direction in which the halftone processing is performed for the divided image.

11. An image processing method of performing halftone processing of an image, the image processing method comprising:

receiving a plurality of pieces of image data corresponding to a plurality of divided images obtained by dividing the image; and providing a plurality of halftone processing units which perform halftone processing of processing each of the plurality of pieces of image data to generate dot data representing presence or absence of dot formation and making at least two halftone processing units simultaneously perform at least a part of processing for the at least two pieces of image data, wherein the halftone processing is complex error diffusion method processing of matching at least a part of the dot data obtained by performing halftone processing using an error diffusion method for a gradation value in which an error diffusion of each pixel of the divided image is completed with a determination result of a dither method, a boundary shape of a divided image is one of (1) a shape along directions respectively parallel to a direction and another direction intersecting the direction in which the halftone processing is performed for the divided image, (2) a shape along a direction oblique to at least one of a direction and another direction intersecting the direction in which the halftone processing is performed for the divided image, and
(3) a shape that randomly changes in a direction in which the halftone processing is performed for the divided image.

* * * * *